United States Patent
McCaskey

(10) Patent No.: US 10,256,453 B2
(45) Date of Patent: Apr. 9, 2019

(54) LEAD ACID BATTERY CELL CONNECTING ASSEMBLY

(71) Applicant: East Penn Manufacturing Co., Lyon Station, PA (US)

(72) Inventor: Scott Allen McCaskey, Shoemakersville, PA (US)

(73) Assignee: East Penn Manufacturing Co., Lyon Station, PA (US)

( * ) Notice: Subject to any disclaimer, the term of this patent is extended or adjusted under 35 U.S.C. 154(b) by 163 days.

(21) Appl. No.: 15/214,959

(22) Filed: Jul. 20, 2016

(65) Prior Publication Data

US 2018/0026253 A1 Jan. 25, 2018

(51) Int. Cl.
- *H01M 2/24* (2006.01)
- *H01M 10/12* (2006.01)
- *H01M 2/20* (2006.01)

(52) U.S. Cl.
CPC .............. *H01M 2/24* (2013.01); *H01M 2/206* (2013.01); *H01M 10/12* (2013.01)

(58) Field of Classification Search
None
See application file for complete search history.

(56) References Cited

U.S. PATENT DOCUMENTS

| | | |
|---|---|---|
| 4,720,440 A | 1/1988 | Yonezu et al. |
| 5,308,719 A * | 5/1994 | Mrotek .................. H01M 2/24 429/160 |
| 5,424,148 A | 6/1995 | Mrotek et al. |
| 5,709,965 A | 1/1998 | Grivel et al. |
| 6,528,206 B2 | 3/2003 | Ruiz Rodriguez et al. |
| 6,635,380 B1 * | 10/2003 | Shimoda ............. H01M 2/0247 429/148 |
| 7,473,488 B2 * | 1/2009 | Knight .................. H01M 2/266 429/122 |
| 8,169,194 B2 | 5/2012 | Altman |
| 2006/0216595 A1 * | 9/2006 | Holliday ................. H01M 2/28 429/211 |
| 2007/0009790 A1 * | 1/2007 | Vutetakis .............. H01M 2/266 429/160 |
| 2011/0300434 A1 * | 12/2011 | Harada ................. H01M 2/043 429/159 |
| 2012/0315531 A1 * | 12/2012 | Lev ..................... H01M 2/0212 429/159 |

FOREIGN PATENT DOCUMENTS

| | | |
|---|---|---|
| EP | 1228549 B1 | 6/2008 |
| GB | 2355848 A | 10/1999 |
| WO | 0161771 A1 | 8/2001 |
| WO | 2011145547 A1 | 11/2011 |

OTHER PUBLICATIONS

Abstract of WO2011145547, dated Nov. 24, 2011, 1 page.

* cited by examiner

*Primary Examiner* — Tracy M Dove
(74) *Attorney, Agent, or Firm* — Barley Snyder

(57) ABSTRACT

A cell connecting assembly is provided and includes a plurality of cells, a plurality of outer cell connectors, and a pair of inner cell connectors. The cells are provided in an odd number arrangement which is greater than one, with each cell having a plurality of plates of differing polarity. The outer cell connectors connect the plurality of cells to provide a single series electrical current path and each outer cell connector is alternatively positioned on opposite sides of a longitudinal centerline of the assembly. The pair of inner cell connectors connected to each other along the longitudinal centerline of the assembly.

9 Claims, 5 Drawing Sheets

LEAD ACID BATTERY CELL CONNECTING ASSEMBLY

FIELD OF THE INVENTION

This invention relates generally to a lead acid battery and, in particular, to a cell connecting assembly for a lead acid battery.

BACKGROUND

Conventionally, a lead-acid battery has a housing with a plurality of cells, each generating approximately 2.1 volts, connected in series to provide a desired battery voltage. For example, six cells generally form a 12 V battery. In an even cell number battery wherein cells are connected in series, the battery has two terminal posts positioned near the same edge. The arrangement results in terminals arranged near the same edge of the battery because of the series connection locations alternating from front to back for each series connected cell. To explain in more detail, each cell includes a number of positive and negative plates, each plate having a tab rising from its top and positioned off-center. The plates are stacked in an alternating fashion, so that all the tabs for plates of the same polarity are lined up with each other, but not with the tabs of the opposite polarity plates. Separators are provided between each plate in order to prevent direct physical contact between plates of opposite polarity. Both the positive and negative plates are connected at the top by separate cast-on-straps that are welded to the tabs. One strap connects the plates of one polarity near the front of the housing and another strap connects the plates of opposite polarity near the back of the housing. Adjacent cells are connected in series to each other by vertical extensions connected to the straps, known as flags or tombstones, that are welded to each other though openings in the housing.

When an odd number of cells is required for the desired voltage, connecting the cells in the customary manner described above results in the terminal posts being positioned near opposite corners of the battery. This creates problems in manufacturing and presents problems with existing venting and valve systems.

SUMMARY

A cell connecting assembly is provided and includes a plurality of cells, a plurality of outer cell connectors, and a pair of inner cell connectors. The cells are provided in an odd number arrangement which is greater than one, with each cell having a plurality of plates of differing polarity. The outer cell connectors connect the plurality of cells to provide a single series electrical current path and each outer cell connector is alternatively positioned on opposite sides of a longitudinal centerline of the assembly. The pair of inner cell connectors connected to each other along the longitudinal centerline of the assembly.

BRIEF DESCRIPTION OF THE DRAWINGS

The invention will now be described by way of example with reference to the accompanying figures, of which.

DETAILED DESCRIPTION OF THE EMBODIMENT(S)

Figure 1:
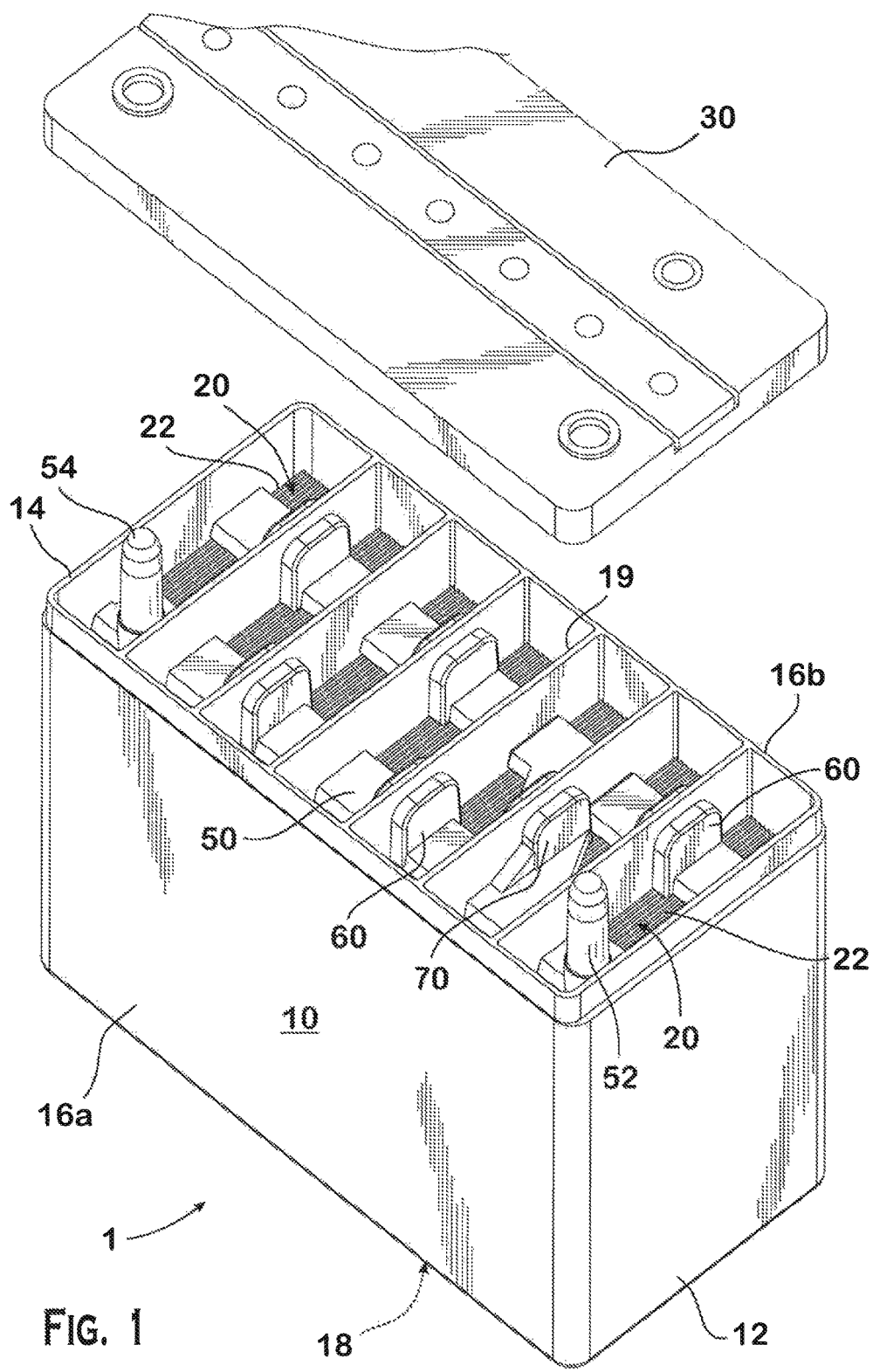
FIG. 1 is a perspective view of a lead acid battery having a cell connecting assembly according to the invention.
Figure 2:
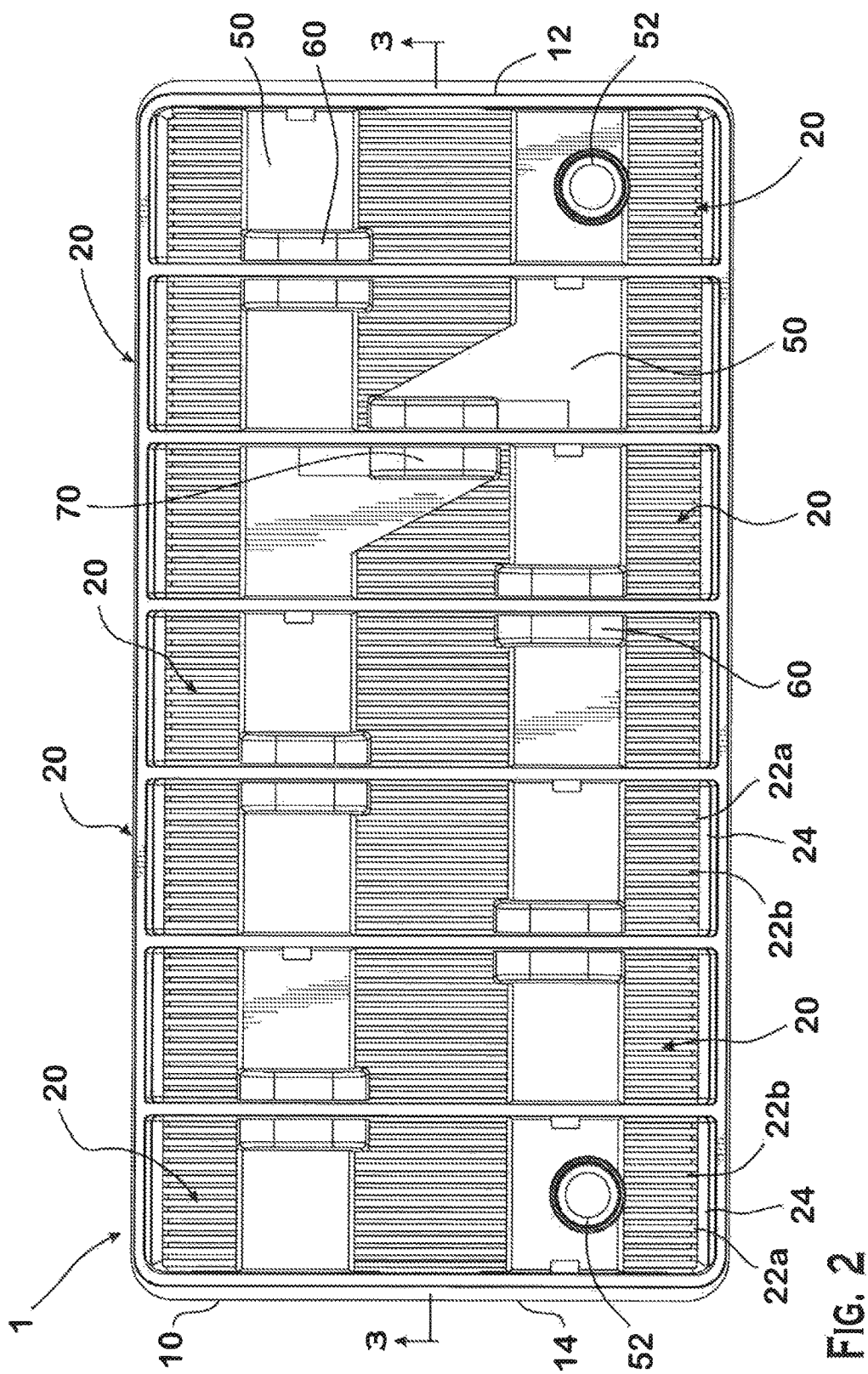
FIG. 2 is a top view of the lead acid battery of FIG. 1.
Figure 3:
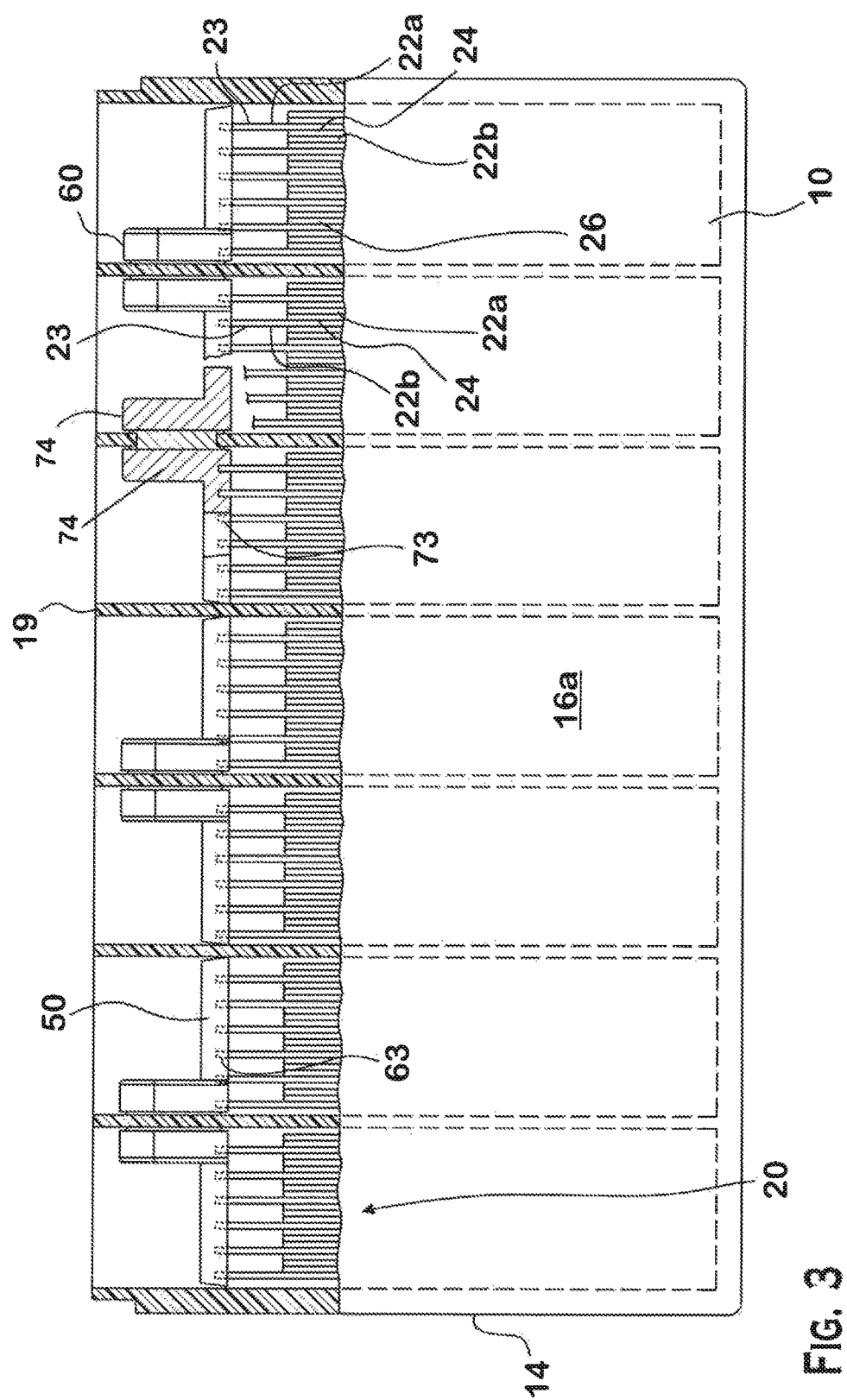
FIG. 3 is a sectional view of the lead acid battery of FIG. 2, taken along line 3-3.

As shown in FIGS. 1-3, a lead acid battery 1 according to the invention is shown. The lead acid battery 1 includes the following major components: a housing 10, a plurality of cells 20, a cover 30, and a cell connecting assembly 50.

As shown in FIG. 1, the housing 10 is a container having a front wall 12, a rear wall 14, a first and second side wall 16a,16b, and a base wall 18. In an embodiment, the length and height of the front wall 12 and the rear wall 14 are approximately equal. In another embodiment, the length and height of the first side wall 16a and the second side wall 16b are approximately equal. The width of the base wall 18 is approximately equal to the length of the side walls 16a,16b. The length of the base wall 18 is approximately equal to the length of the front wall 12 and the rear wall 14. The height of the side walls 16a, 16b is approximately equal to the height of the front wall 12 and the height of the rear wall 14. The four substantially rectangular walls of substantially equal height and the substantially rectangular floor together form a box.

An interior of the housing 10 is divided into N substantially equal cell cavities by a plurality of N−1 partitions 19 substantially parallel to the end walls 12,14. The height of the partitions 19 is substantially equal to the height of the four outer walls 12,14,16a,16b. As shown, the housing 10 includes a plurality of cells 20 and of partitions 19 and, in particular, seven cells 20 and six partitions 19. However, one skilled in the art should appreciate that for the implementation of this invention the number of cells 20, N, can be any odd integer greater than one.

The housing 10 can be made from a heat moldable plastic resin or any suitable non-conductive material resistant to sulfuric acid and known to those of ordinary skill in the art.

As shown in FIGS. 1-3, each cell cavity 20 receives a plurality of battery plates, including a plurality of positive plates 22a and plurality of negative plates 22b, and a plurality of separators 24. Each plate 22 has a tab 23, which is positioned off-center in the embodiment shown, and disposed on the top end thereof. Suitable rotation of the plates allows all the tabs of the plates of one polarity to be lined up with each other forward of the battery center line while all the tabs of the plates of the opposite polarity are lined up with each other to the rear of the battery center line.

Each plate 22 is formed as a grid with perforations extending from one planar surface to an opposite planar surface thereof. Each surface on the positive plate 22a is coated with a positive active material which also fills the grid perforations. Each surface of the negative plate 22b is coated with a negative active material which fills the grid perforations. The grid forms a framework and current collector for the plates and is typically made substantially of lead. However, one skilled in the art should appreciate that any compatible arrangement of materials suitable for this framework and collecting of the current to a tab may be employed.

Each separator 24 is a porous electrical insulator substantially impervious to the electrolyte and resistant to electrochemical oxidation. The electrolyte is commonly a solution of water ($H_2O$), sulfuric acid ($H_2SO_4$) and possibly various additives. When interposed between two adjacent positive and negative plates 22a, 22b, the separator 24 prevents electrical contact between adjacent plates 22a, 22b while providing minimal restriction to movement of ions ($H_3O^+$, $HSO_4^-$) and water molecules ($H_2O$). Separators can be made from various materials including micro-porous polyethylene, matted substantially glass fibers, phenolic sheet, certain rubber materials, expanded PTFE or any suitable non-conductive porous material known in the art.

The positive and negative active materials generally begin as a paste of lead oxide (PbO or lead (II) oxide), lead, water and sulfuric acid. Other ingredients in may include fibers or red lead ($Pb_3O_4$) in positive plates. Negative recipes may include fibers, barium sulfate ($BaSO_4$), lignins, or various forms of carbon. Through processes of curing and electrical formation, the materials are converted substantially to lead dioxide ($PbO_2$ or lead (IV) oxide) in the case of positive plates or lead sponge (Pb) in the case of negative electrodes. However, one skilled in the art should appreciate that other known starting ingredients or conversion methods may be used.

In the shown embodiment, the plurality of partitions 19 are used to separate each cell cavity 20 from adjacent cell cavities 20. The partition 19 is generally made from the same material as the housing and is often molded with the housing as a single piece. Any suitable material capable of substantially blocking ion flow between cells and allowing a series electrical connection to be made through it may be used by those skilled in the art.

As shown in FIGS. 1-3, the cover 30 is provided for the housing 10. Exemplary embodiments of the cover 30 include a plurality of mold well receiving openings, cutouts, and at least two terminal bushings (not shown). The cover 30 is generally rectangular in shape, with a length greater than the length of the base wall 18 of the housing 10 and with a width greater than the width of the base wall 18. The cover 30 may include a wall receiving groove (not shown) that extends around the periphery of a bottom surface of the cover 30, proximate to an outer circumferential edge of the cover 30. Further embodiments may include an electrolyte filling hole that extends through the cover 30. The cover 30 can be made from a heat moldable resin or any suitable plastic material known to those of ordinary skill in the art.

Figure 4:
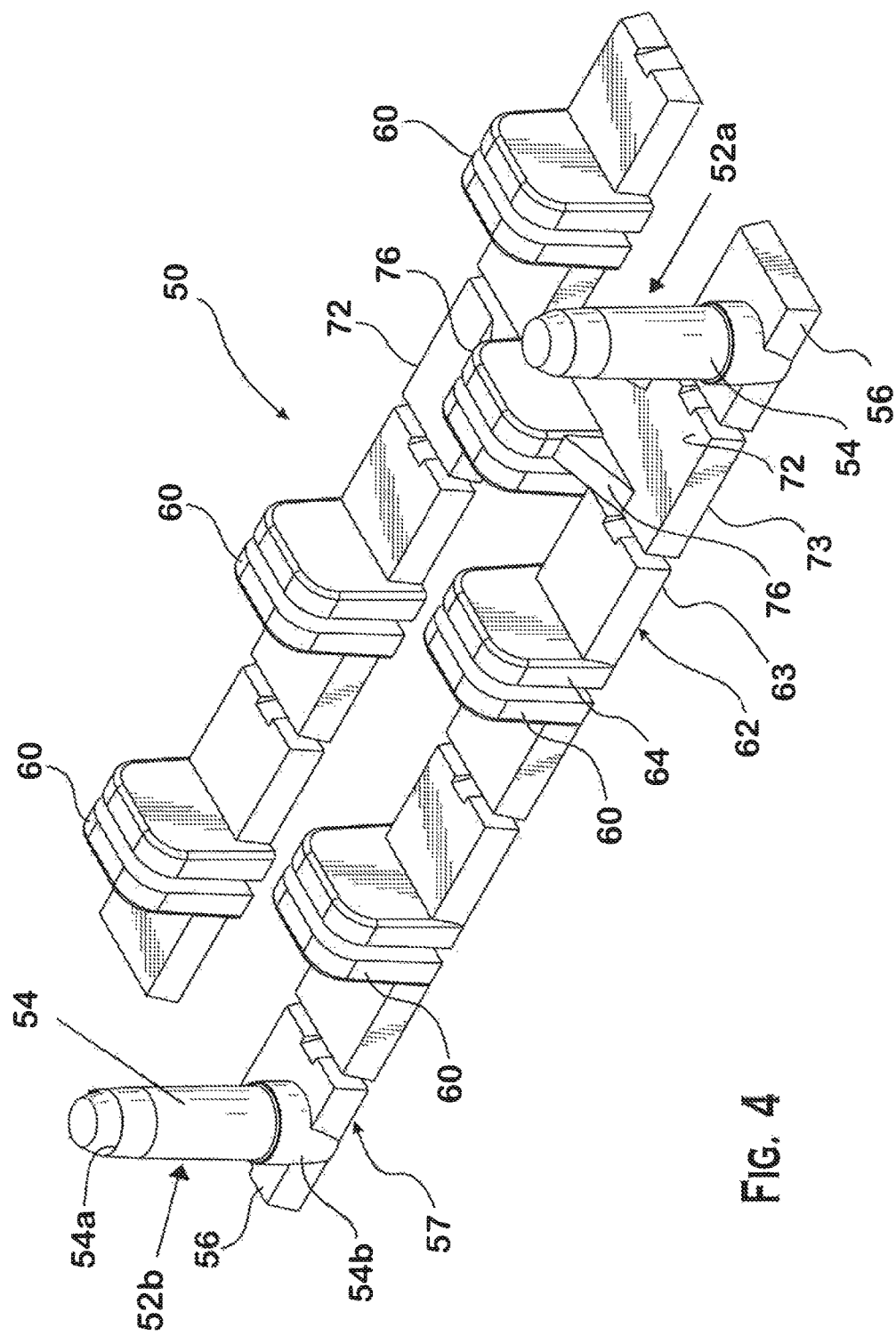
FIG. 4 is a perspective view of the cell connecting assembly according to the invention.
Figure 5:
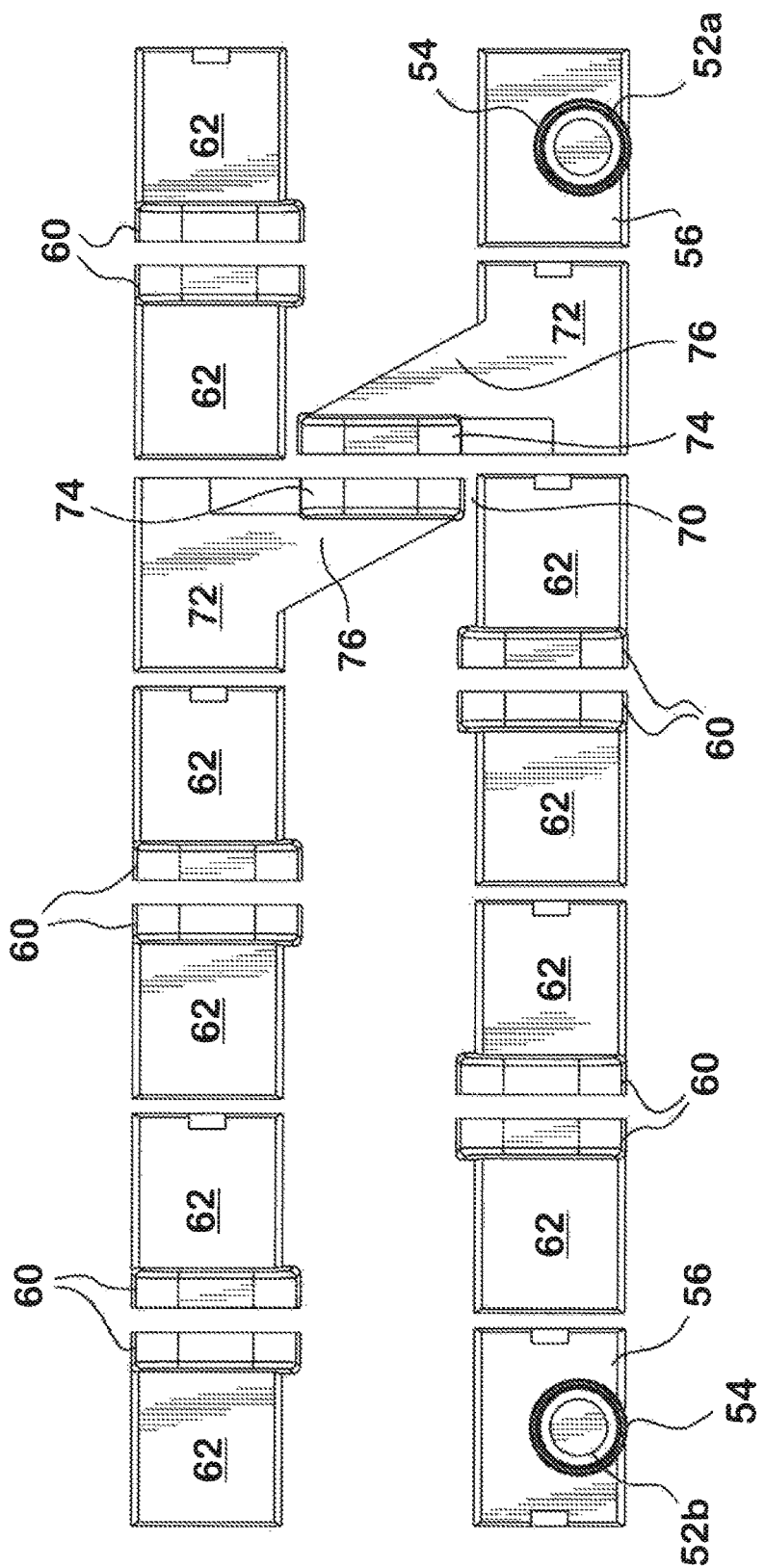
FIG. 5 is a top view of the cell connecting assembly shown in FIG. 4.

As shown in FIGS. 4 and 5, the cell connecting assembly 50 according to the invention includes a pair of terminal posts 52, a plurality of cell connectors 60, and a single pair of cell connectors 70 that are centrally positioned along a longitudinal axis of the housing 10.

In the shown embodiment, the pair of terminal posts 52 include a positive terminal post 52a and a negative terminal post 52b positioned at opposite ends of the lead acid battery 1. In particular, the positive terminal post 52a is positioned at a first end along a first side of the housing 10, while the negative terminal post 52b is positioned a second end, opposite the first end, along the same edge of the housing 10.

Each terminal post 52 includes a post section 54 and a cell connecting body 56. The post section 54 in the shown embodiment is an elongated tubular body having a blunt end 54a opposite the cell connecting body 54b, 56. The post section 54 extends substantially orthogonal with respect to the cell connecting body 56. In particular, in the shown embodiment, the post section 54 is positioned adjacent and connects to the cell connecting body 56. However, in other embodiments the post section 54 may extend from the cell connecting body 56. The cell connecting body 56 is a flat planar body having a cell connecting surface 57 disposed on a lower surface thereof. In the shown embodiment, all the tips of the plate tabs 23 that are aligned with the cell connecting body 56 penetrate the cell connecting surface 57 and are at least partially fused together (see FIG. 3). The terminal posts 52 are made from lead, copper, or any other common electrically conductive material known to those of ordinary skill in the art.

As shown in the FIGS. 4 and 5, each off-center cell connector 60 includes a strap 62 and a flag 64. The strap 62 is an elongated body extending along horizontal plane along a longitudinal length of lead acid battery 1. The strap 62 includes a cell connecting surface 63 disposed on a lower surface thereof. In the shown embodiment, all the tips of the plate tabs 23 that are aligned with the strap 62 penetrate the cell connecting surface 63 and are at least partially fused together (see FIG. 3). The flag 64 is a tabular body in the embodiment shown, which extend substantially orthogonal to the strap 62. As shown, the flag 64 is positioned adjacent and connects to the strap 62. However, in other embodiments, the flag 64 may extend from the strap 62. As shown, the strap 62 and the flag 64 are integrally formed. However, one skilled in the art should appreciate that other designs are possible, including a multi-piece assembly, with the strap 62 and flag 64 connected through a mechanical connection, such as a weld or fastener.

Now, with reference to FIGS. 4 and 5, the pair of inner cell connectors 70 will be discussed. In particular, each inner cell connector 70 includes a strap 72, a flag 74 and a link 76.

The strap 72 is an elongated body extending along horizontal plane along a longitudinal length of lead acid battery 1. The strap 72 includes a cell connecting surface 73 disposed on a lower surface thereof. In the shown embodiment, all the tips of the plate tabs 23 that are aligned with the strap 72 penetrate the cell connecting surface 73 and are at least partially fused together (see FIG. 3). The flag 74 is a tabular body in the embodiment shown and extends substantially orthogonal with respect to the strap 72. As shown, the flag 74 is offset from the elongated body of the strap 72. The link 76 is an elongated body connecting the flag 74 and the strap 72. As shown, the strap 72, the flag 74, and the link 76 are integrally formed. However, one skilled in the art should appreciate that other designs are possible, including a multi-piece assembly, with the strap 72, the flag 74, and the link 76 connected through a mechanical connection, such as a weld or fastener.

Now, positioning of various components of the cell connecting assembly 50 will be described in detail with reference to FIGS. 4 and 5.

A first pair of outer cell connectors 60 are aligned with each other, such that each strap 62 is linearly aligned with the other and the pair of flags 64 face each other. Next a second pair of outer cell connectors 60 positioned opposite the first pair of outer cell connectors 60 and aligned with each other. Each strap 62 of the second pair of outer cell connectors 60 is linearly aligned with the other, and the pair of flags 64 face each other. Next, the pair of inner cell connectors 70 are positioned between the first pair of outer cell connectors 60 and the second pair of outer cell connectors 60. The straps 72 are offset from each other, with one strap 72 aligned with the strap 62 from the first pair of outer cell connectors 60, and another strap 72 aligned with the strap 62 of the second pair of outer cell connectors 60. The pair of flags 64 face each other in a substantial center between the pair of straps 72.

A first terminal post 52 is disposed on one side of the pair of inner cell connectors 70, while a second terminal post 52 is positioned on an opposite side of the pair of inner cell connectors 70. The first terminal post is positioned opposite the first pair of the outer cell connectors 60 and aligned with the second pair of outer cell connectors 60. The second terminal is positioned adjacent to and aligned with the second pair of outer cell connectors 60.

Now, assembly of the lead acid battery 1 will now be describe in detail with reference to FIGS. 1-3.

As for positioning, the plurality of positive plates 22a and plurality of negative plates 22b are positioned in the housing 10. Each positive plate 22a and negative plate 22b is separated from each other by the separator 24, and an electrolyte is disposed with an electrolyte receiving space 26. Each cell 20 is separated from each other by the divider 19.

Next, the cell connecting assembly 50 is positioned in the housing 10 on top of the cell 20, with the terminal posts 52 connect with cells 20 at opposite ends of the lead acid battery 1. The plurality of outer cell connectors 60 and pair of inner cell connectors 70 also connecting with cells 20.

The assembly consisting of the straps 72, flags 74, links 76 and posts 52 is cast and simultaneously welded to the proper plate tabs 23. Proper plate polarity must be maintained throughout the final series circuit. In the diagrammed embodiment the straps 72 with notched ends are intended to be welded to positive plates 22a and the opposite straps to negative plates 22b. It should be clear to those skilled in the art that other methods of polarity marking are acceptable. It should be clear to those skilled in the art that visible polarity markings are for the benefit of human observers and not strictly necessary for the workings of the battery. Holes are punched through the container partitions so that every opposed pair of flags will be centered over a hole after the assembly is stuffed into the housing. Electrical connections between opposing flags are made through the holes by a welding or similar process.

Next, the cover 30 connects with the housing 10 and encloses the cells 20.

Electrolyte is added. The battery is electrically formed. The electrolyte levels or strength may be adjusted and the battery is closed up. It should be understood by those skilled in the art that several variations are possible. Formation of the plates could occur prior to assembly. Formation of the assembled elements could occur prior to stuffing them into the housing. In these manufacturing variations, the responsibility of filling the battery with electrolyte could shift to the end user after sale.

The terms and expressions which are employed in this specification are used as terms of description and not of limitation. Mirrored or rotated configurations are equally functional. There is no intention in the use of such terms and expressions of excluding any equivalents of the features shown and described or portions thereof. It is recognized that various modifications are possible within the invention described and claimed herein.

What is claimed is:

1. A cell connecting assembly, comprising:
a first pair of outer cell connectors aligned with each other along a longitudinal direction of the assembly and including a pair of first outer flags facing each other;
a second pair of outer cell connectors aligned with each other along a longitudinal direction of the assembly and including a pair of second outer flags facing each other, the second pair of outer cell connectors positioned offset from the first pair of outer cell connectors in a direction perpendicular to the longitudinal direction of the assembly; and
a pair of inner cell connectors including
a pair of inner flags facing each other and positioned substantially in a center between the first pair of outer cell connectors and the second pair of outer cell connectors, and
a pair of inner straps with a first inner strap aligned along the longitudinal direction with the first pair of outer cell connectors and a second inner strap aligned along the longitudinal direction with the second pair of outer cell connectors.

2. The cell connecting assembly according to claim 1, wherein each of the inner straps is positioned offset from the inner flags in the direction perpendicular to the longitudinal direction.

3. The cell connecting assembly according to claim 2, wherein each of the plurality of inner cell connectors further includes a link positioned between and connecting the inner strap with the inner flag.

4. The cell connecting assembly according to claim 1, wherein the first pair of outer cell connectors includes a pair of first outer straps linearly aligned with each other.

5. The cell connecting assembly according to claim 1, wherein the second pair of outer cell connectors includes a pair of second outer straps linearly aligned with each other.

6. The cell connecting assembly according to claim 1, wherein the pair of inner flags are positioned between the pair of inner straps.

7. The cell connecting assembly according to claim 1, further comprising a first terminal post disposed on one side of the pair of inner cell connectors and a second terminal post positioned on an opposite side of the pair of inner cell connectors.

8. The cell connecting assembly according to claim 7, wherein the first terminal post is positioned opposite the first pair of outer cell connectors and aligned with the second pair of outer cell connectors.

9. The cell connecting assembly according to claim 8, wherein the second terminal post is positioned adjacent to and aligned with the second pair of outer cell connectors.

* * * * *